Dec. 18, 1945.   T. A. RICH   2,391,271

FLUX MEASUREMENT

Filed Sept. 1, 1943

Inventor:
Theodore A. Rich,
by Harry E. Dunham
His Attorney.

Patented Dec. 18, 1945

2,391,271

UNITED STATES PATENT OFFICE 2,391,271

FLUX MEASUREMENT

Theodore A. Rich, Schenectady, N. Y., assignor to General Electric Company, a corporation of New York Application September 1, 1943, Serial No. 500,803

7 Claims. (Cl. 171—95)

My invention relates to a method and apparatus for measuring unidirectional fluxes, and it is particularly beneficial for the measurement of direct current over a wide range and up to high values of direct current flowing in large buses or cables by means of sensitive flux measuring apparatus.

The conventional method of measuring large values of direct current has been to connect a current shunt in the direct current circuit and measure the variation in voltage drop across such shunt with a low current instrument calibrated with the shunt and shunt leads in terms of line current. Where large direct current bus or cable structures are used for carrying many thousands of amperes, such conventional apparatus becomes quite expensive and involves opening the direct current circuit to insert the shunt, since a special shunt having a negligible temperature coefficient of resistance must be used. My invention may be used for measuring large direct currents at small expense and without the necessity of disturbing the direct current cables or bus structure.

Figure 1:
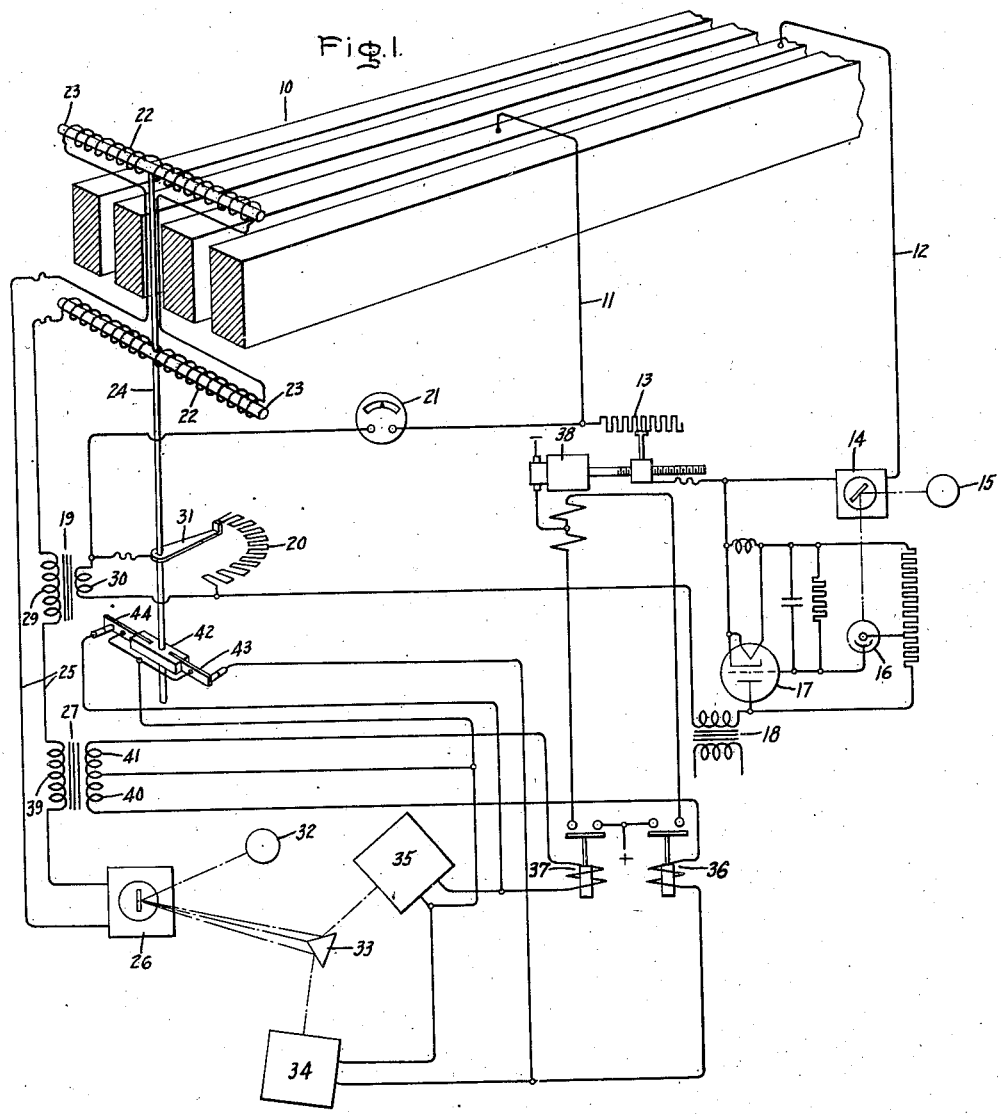
Figure 2:
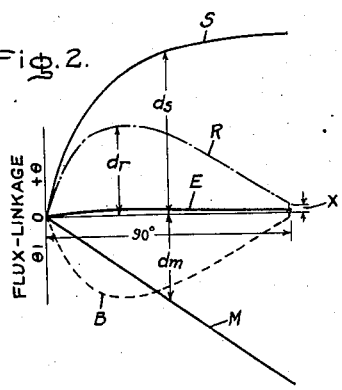

Fig. 1, in the accompanying drawing, illustrates a schematic view of apparatus and circuit connections which may be used in carrying out the invention. Fig. 2 illustrates a set of curves for use in describing the operation of the apparatus.

Referring to Fig. 1, 10 represents one cable or bus of a direct current circuit adapted to carry many thousands of amperes. The size and current carrying capacity of the bus and amount of current to be measured are not limitations to the use of my invention. The bus 10 is shown as being made up of several sections in accordance with good practice where large currents are involved, but it will be assumed that whatever current is flowing divides proportionally in the several sections in first explaining the action. Later it will be shown that this is not an essential condition of operation. Connected across a suitable short section of the bus 10 by leads 11 and 12 and a variable resistance 13, is a sensitive detector of voltage 14 having a mirror on its moving element and which is used in combination with a light source 15 and a light sensitive cell 16 to control an amplifier tube 17. The tube 17 controls the current in a circuit including a source of supply 18, a mutual inductance 19 in parallel with a variable resistance 20, an ammeter 21, and a section of the variable resistance 13. For any given setting of the resistance 13 the action of instrument 14, phototube 16, and amplifier 17 is to so control the current in the output circuit of the amplifier as to balance the voltage drop due to such current flowing through resistor 13 with the voltage drop produced therein by the current flowing in bus 10. Hence, so far as the controlling action of instrument 14 is concerned, it tends to produce a current flow in the output circuit of tube 17 through ammeter 21 which is very roughly proportional to the current flowing in bus 10. However, without further refinements the apparatus thus far described could not be depended upon to measure the current flow in bus 10, because the bus section across which leads 11 and 12 are connected is not a calibrated shunt and does not have current shunt characteristics and features necessary for accurate current measurement. The inexpensive controller thus far described does, however, serve to produce a useful comparison current which, after further regulation by means of an accurate flux measuring apparatus to be described, can be used for accurate measurement purposes.

Also associated with current bus 10, is a flux pickup device consisting of coils 22 which may or may not be wound on magnetic strips 23 on opposite sides of the bus 10. This flux pickup is mounted for rotation with a shaft 24 so that the axes of coils 22 may be turned from a position parallel to the bus where they will pick up no flux to a position at right angles to the bus, as shown, where they will pick up a maximum flux due to the current flowing in bus 10. The coils 22 are connected in series in adding relation so as to produce a flux linkage in a circuit 25, when the flux measuring coils are turned, proportional to the current flow in bus 10.

Included in circuit 25 is a sensitive fluxmeter 26 and coils of mutual inductances 19 and 27. It is noted that the mutual inductance 19 has one of its coils 29 connected in the flux pickup circuit 25 and the other coil 30 in the previously mentioned output circuit of tube 17 in order that the current in the flux pickup circuit may be compared with that in the circuit of ammeter 21. However, in order that such comparison may take place in approximately the same ratio as the flux linkage in the flux pickup circuit 25 is induced therein by the turning of the flux pickup coils 22, the flux linkage in mutual inductance 19 due to current flow in the circuit of ammeter 21 is made to vary with the turning of the flux pickup coils 22. The coil 30 thereof which is in series with ammeter 21 could be mounted on shaft 24, but it is more convenient to provide the resistance 20 in shunt to such coil and vary the resistance short circuit instead. Accordingly, the resistance 20 is arranged in shunt to the coil 30, and the variable resistance tap 31 of this resistance is mounted to turn with shaft 24 so that when coils 22 are turned to pick up flux, resistance 20 is inserted allowing current to flow in coil 30. Variation of resistance 20 does not change the current flow in the circuit of meter 21. When coils 22 are in a position to pick up zero flux, coil 30 is short circuited and no current flows therein. The current flow in coil 30 induces in circuit 25 a voltage which is opposed to that induced in circuit 25 by pickup coils 22, and hence, the resultant voltage induced in circuit 25 is the difference, if any, of such induced voltages, and such differential voltage is that which influences fluxmeter 26.

Instrument 26 has a mirror on its moving element and cooperates with a light source 32, a light beam divider 33, and a pair of photocell amplifiers 34 and 35 to control relays 36 and 37 which in turn control a reversible pilot motor 38 used to adjust the resistance 13 in a direction and extent as needed to regulate the current in the output circuit of amplifier 17, and through coil 30 and ammeter 21 to the correct measurement value. For example, the desired ratio of current flow in bus 10 and meter 21 may be 40,000 to 1 for correct measurement. If there are 40,000 amperes flowing in bus 10 and 1.05 amperes flowing in meter 21, a measurement operation will result in the voltage of mutual inductance 19 being slightly in excess of that induced by flux pickup 22, and instrument 26 will deflect to shine light on photocell amplifier 34 which will operate relay 36 and cause motor 38 to rotate in a direction to increase the resistance 13. This will reduce the deflection of instrument 14, which will decrease the positive bias of amplifier tube 17 and decrease the current in ammeter 21 and coil 30 until instrument 26 returns to a zero deflection when the regulation will stop, at which time meter 21 will read correctly. On the other hand, if the current in the measurement circuit of meter 21 is too low, the voltage of pickup coil 22 will predominate and cause instrument 26 to deflect in the other direction, causing light to shine on photocell amplifier 35, thereby energizing relay 37 and rotating motor 38 in a direction to decrease resistance 13. This will increase the deflection of instrument 14 and increase the positive bias of amplifier tube 17, and increase the current in meter 21 and coil 30 until it is correct and instrument 26 is brought back to a neutral position, when the regulation will cease with the correct value of measuring current flowing in instrument 21. The photoelectric amplifier arrangement for controlling relays 36 and 37 is diagrammatically illustrated, but it may be similar to that described in United States Patent No. 1,897,850 to La Pierre, February 14, 1933.

Following a correcting calibration operation as above described, by the rotation of coil 22 and associated rheostat arm 31, and switch 42, the apparatus will be left in the condition represented, with a deflection of instrument 14 and an adjustment of resistance 13 which will cause a current to flow in ammeter 21 correctly proportional to that in bus 10. Now, so long as there is no change in temperature in bus 10 or other conditions influencing the calibration, ammeter 21 will continue to indicate correctly the current flowing in bus 10 and will follow the variations in such current. The flux measurement system serves as a monitor. The current in ammeter 21 normally follows the bus current with only minor errors, so that a continuous measurement indication is obtained, and the rotation of the flux pickup coil is for the occasional correction of these minor errors as needed by recalibration of the shunt 11, 12, 13, and 14, and the regulating apparatus described.

When the pickup coil is rotated to take a measurement, it may happen that the rate of flux change in its coil with angular deflection and the rate of change of flux in mutual inductance 29 due to the shorting effect of resistance 20 may be quite different over the flux coupling range of movement even though the final resultant change is the same, because it will be difficult to match this characteristic of these two devices. This is illustrated in the curves of Fig. 2 where the ordinates represent integrated flux linkage of circuit 25 and the abscissa the angular movement of the search coil. Let curve S, Fig. 2, represent the integrated number of lines of flux linked by coils 22 due to a given current flow in bus 10 as the coils are turned through an angle of 90 degrees to the position shown in Fig. 1. At 0 angle the flux linkage is zero and at 90 degrees the flux linkage rises to a maximum value proportional to the current in bus 10. While this coil is being turned, resistance 20 is being cut out and current flows and increases in coil 30 of mutual inductance 19, thus also linking flux lines with circuit 25. The linkage of mutual inductance 19 is made to oppose that of curve S and thus the flux linkage of mutual inductance 19 is plotted negative and may be represented by curve M, it being understood that both curves are plotted to the same flux unit scale. The difference between the plus and minus flux linkage is represented by the dotted dash curve R. In the example given it is seen that the total resultant final flux linkage at the end of the 90-degree swing has a positive value X, indicating that the current in the measurement circuit of meter 21 is too low and should be adjusted accordingly by an amount to bring the value X to zero, at which time meter 21 will correctly indicate the current flow in cable 10.

If search coils 22 were the only flux linkage coils in the circuit 25, fluxmeter 26 would attempt to deflect in one (positive) direction according to the curve S. That is, at 45 degrees swing, meter 26 would attempt to deflect to an amount $ds$, etc. If mutual inductance 19 was used alone with the same value of current in its primary, the instrument 26 would attempt to deflect by an amount $dm$ in the negative or opposite direction at 45 degrees swing. Owing to the bucking relation of the fluxes S and M, the meter 26 attempts to deflect according to curve R and, if capable of doing so, would follow the curve R and have a final deflection X in the positive direction. We are interested in only the deflection X for measurement and regulating purposes and it is desirable for accurate results that the fluxmeter 26 be of such sensitivity as to produce a good regulating deflection for the value X and other smaller final resultant flux measurements. However, if we used a fluxmeter having the high sensitivity necessary for good measurement of flux values corresponding to X, and took no further precautions, such meter would be banged off scale, probably damaged, and in any event, the resultant flux integration measurement destroyed by reason of the large resultant flux linkage $dr$, for example. To prevent such results and still enable me to use a fluxmeter at 26 with the desired high sensitivity, I provide the additional flux coupling mutual inductance 27 having winding 39 in circuit 25 and windings 40 and 41 in the output circuits of photoelectric amplifiers 34 and 35, respectively. In the example given, assuming instrument 26 deflects to throw light on photocell 34, coil 40 in its output circuit produces a compensating flux linkage in circuit 25 through mutual inductance 27 corresponding to negative curve B, Fig. 2, which bucks flux linkage curve R down to curve E, E being the difference between curves R and B. The connection of the secondary windings 40 and 41 is made such as to buck the voltage in circuit 25 which produces the deflection of instrument 26, which causes current to flow in coils 40 and 41. Thus, when R causes instrument 26 to deflect to direct light on photocell amplifier 34, the output current flows in coil 40 and induces a voltage in circuit 25 which bucks the resultant R and, as a result, the deflection of instrument 26 is held down or the sensitivity of the flux measuring system as a whole but not the fluxmeter itself is, in effect, greatly reduced until close to the end of the flux linking operation, at which time the secondary coils 40 and 41 are short circuited by a switch arm 42 and switches 43 and 44 operated from shaft 24. The deflection of instrument 26, instead of attempting to go to dr, Fig. 2, is then only a small fraction thereof such as curve E, Fig. 2, and it is only when the flux linking operation has been substantially completed that instrument 26 is energized by the full difference between flux linkages S and M or X, Fig. 2. The device 39 serves to store the excess differential flux linkage until near the end of the calibrating operation.

It is also to be noted that the coils 40 and 41 are in series with the coils of relays 36 and 37 until the coils 40 and 41 are short circuited. Until the coils 40 and 41 are short circuited, the deflection is small. However, when the coils 40 and 41 are short circuited, the resultant change of current produces a change in flux linkage in circuit 25 and now instrument 26 gets a deflection which is the equivalent of the change X shown in Fig. 2. The relays can then be operated by the output current of the photoelectric amplifiers 34 or 35, and this will cause operation of the pilot motor to increase or decrease the output of 17 to correct the ratio of currents. Once a relay is energized, it stays energized until the deflection instrument 26 has been returned to nearly its zero position. Due to the return spring on 26 this will occur in a few seconds in any event, in which case complete correction may not be obtained in a single operation. The above cycle is reversed to bring coils 22 and 30 to their original position with the pilot motor deenergized. A repetition of the correcting action described above will bring the ratio even closer to the required value. The changes in ratio are primarly due to changes in bus resistance and since these changes are slow this checking comparison need not be rapid. For example, a correction cycle and return can be made in 13 seconds, and good accuracy can be obtained by say four cycles in succession followed by a wait of 10 minutes.

The operation of the apparatus to make a current measurement is as follows: The apparatus is connected as described. If the flux pickup coils are not in the neutral position parallel to bus 10, they are moved to that position. Such movement of course produces flux linkage changes but instrument 26 is protected, as above described, and no regulation of resistor 13 results. In this connection it may be noted that by reversing the connections of coils 22 to circuit 25 and short circuiting coils 40 and 41 at the other end of the movement of the flux linkage operation, the measuring and regulating operation could be made just as well by moving coils 22 from flux linking to nonflux linking position, as in the reverse direction, because either operation produces a flux linkage change in pickup coils 22 proportional to the current flow in bus 10. When the flux pickup coils are in the neutral position parallel to bus 10, resistance 20 is short circuited and switches 43 and 44 are open. A current is flowing in instrument 21 and switch arm 31 roughly proportional to that in bus 10, although it may be several per cent higher or lower than that required for correct calibration. Instrument 26 is in a neutral position since, if not in such position, it will automatically be moved to such position by reason of current flow in one or the other of coils 40 or 41. Shaft 24 is now turned through an angle of 90 degrees and stopped in the maximum flux linkage position with respect to bus 10 by suitable stops which may be represented in Fig. 1 by the stationary switch contacts 43 and 44. The rate at which such movement takes place is immaterial. If the flux linkage curves S and M do not coincide, coils 40 or 41 will be energized to hold the resultant flux linkage in circuit 25 and the deflection of fluxmeter 26 down to a low value until such coils are short circuited at the end of the operation, at which time if X, Fig. 2, is not zero, instrument 26 will deflect one way or the other depending upon whether X, Fig. 2, is positive or negative, the corresponding relay 34 or 35 will be energized, and motor 38 will run in one direction or the other to decrease or increase the resistance at 13. This action will continue perhaps for several cycles until the current in coil 30 mutual inductance has reduced or increased its flux linkage to reduce the net change in flux linkage of circuit 25 to zero, so that fluxmeter 26 has no net deflection and the regulation will cease. The current flowing in bus 10 is then correctly indicated on ammeter 21.

The principle of the use of a protective or compensating mutual inductance, such as represented at 39 in Fig. 1, and which serves to prevent damage to the flux-meter without reducing its sensitivity, is capable of general application and is very useful. For example, in Fig. 1, suppose it was simply desired to measure the flux linkage of coils 22 with great accuracy, and that the mutual inductance at 19, the switch 42, and the relays 36 and 37 were omitted. The mutual inductance at 39 would serve to protect the sensitive fluxmeter as before, and at the end of a flux measurement linkage operation, the amount of flux linkage contributed by coil 39 could be accurately determined from its mutual inductance ratio and a measurement of the current in the direct current circuit of its primary coil 40 or 41. The deflection of the fluxmeter would then correspond to the flux linkage of coils 22 less the known flux linkage produced at 19. In this way a fluxmeter having the sensitivity capable of being built into a null type instrument may be used to measure fluxes covering a wide range with very high accuracy.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A direct current measuring system in combination with the conductor in which the current is to be measured, a direct current metering circuit the current in which is regulated in response to the voltage drop across a section of such conductor, means for comparing the proportionality between the current flowing in said metering circuit and said conductor comprising a flux measuring circuit containing a fluxmeter and means for simultaneously causing said flux measuring circuit to be linked by flux produced by current flow in said conductor and by flux produced by current flow in said metering circuit but in opposite directions such that the fluxmeter responds to the difference in such flux linkages, and means controlled by said fluxmeter for calibrating the regulation of the metering circuit as needed to cause the current flow therein to be a predetermined fraction of the current flow in said conductor.

2. A direct current measuring system comprising in combination with a conductor carrying the current to be measured, a circuit connected across a section of said conductor so as to obtain a voltage approximately proportional to the current flow in said conductor, said circuit including a variable resistance and a sensitive voltage detecting instrument, a metering circuit in which said variable resistor is also included, means in the metering circuit controlled in response to said voltage detecting instrument for regulating the current flow in said metering circuit tending to maintain said current proportional to the voltage drop across said conductor section, a flux linkage measuring circuit having a coil linked with the flux field of said conductor, a mutual inductance having one coil in said metering circuit and the other coil in said flux linkage measuring circuit, a sensitive flux measuring instrument connected in the flux linkage circuit for measuring differences in the flux linkage by said conductor and mutual inductance, and means controlled in response to the differential measurement of said flux measuring instrument for adjusting said variable resistance in a direction to maintain the current in said metering circuit proportional to the flux field of said conductor.

3. In a differential flux measuring system comprising a flux measuring circuit including a sensitive fluxmeter, means for causing said circuit to be differentially linked with two fluxes to be compared but under conditions such that the time or rate at which the two fluxes link the circuit differs such that during the flux linking operation the fluxmeter is likely to be damaged due to a differential flux linkage in excess of that to be measured, means for protecting the fluxmeter during such operation comprising means for linking said circuit with a compensating flux which is proportional to the fluxmeter deflection and in a direction to reduce the fluxmeter deflection during all but the final period of the measurement flux linking operation, and means for reducing any compensating flux to zero at the end of the measurement flux linking operation.

4. In a flux measuring system, a flux measuring circuit including a sensitive fluxmeter, means for linking said circuit with different fluxes the algebraic sum of which is to be measured but under conditions such that during the flux linking operation the circuit is likely to be subjected to a resultant flux linkage in excess of the final flux linkage to be measured and such that the fluxmeter is likely to be damaged, means for protecting the fluxmeter during such flux linkage measuring operation comprising means for linking the flux measuring circuit with a compensating flux which is proportional to the fluxmeter deflection and which is in a direction to reduce the fluxmeter deflection, and means for eliminating any compensating flux linkage at the end of the measurement flux linkage operation whereby the final deflection of the fluxmeter corresponds to the algebraic sum of the measurement fluxes.

5. In a flux measuring system, a flux measuring circuit including a sensitive fluxmeter, means for linking said circuit with a flux to be measured, a mutual inductance having a coil in said flux measuring circuit and another coil in a direct current circuit, and means responsive to the deflection of said fluxmeter for controlling the current in said direct current circuit in proportion to such deflection, said mutual inductance producing a flux linkage in the flux measuring circuit in a direction which tends to reduce the deflection of said fluxmeter and serves to protect the fluxmeter from excessive deflections without reducing its sensitivity for flux measurement purposes.

6. In a differential flux measuring system, a flux measuring circuit including a fluxmeter, and a coil which is movable from nonlinking to linking position with respect to a measurement flux, means other than through said coil for introducing another flux linkage into said flux measuring circuit which is in opposition to the measurement flux linkage, means for controlling the magnitude of such opposition flux linkage, and means for simultaneously moving said coil from nonflux linkage to flux linkage position and operating said controlling means to increase the opposing flux linkage.

7. In a differential flux measuring system, a flux measuring circuit including a fluxmeter, a movable coil in said circuit adapted to be moved to link with a measurement flux, a mutual inductance having a secondary winding in said flux measuring circuit and a primary winding in a direct current circuit for producing a flux linkage in the flux measuring circuit which is opposed to the measurement flux, means for controlling the current flow in said primary winding, and means for simultaneously moving the movable coil from nonflux linkage to flux linkage position and operating said current controlling means to increase the current flow in said primary winding.

THEODORE A. RICH.